US008693010B2

(12) United States Patent
Sumii et al.

(10) Patent No.: US 8,693,010 B2
(45) Date of Patent: Apr. 8, 2014

(54) IMAGE FORMING APPARATUS

(75) Inventors: Mika Sumii, Tokyo (JP); Hiroshige Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 456 days.

(21) Appl. No.: 13/165,633

(22) Filed: Jun. 21, 2011

(65) Prior Publication Data

US 2012/0002228 A1 Jan. 5, 2012

(30) Foreign Application Priority Data

Jun. 30, 2010 (JP) ................................. 2010-150243

(51) Int. Cl.
*G06K 15/16* (2006.01)

(52) U.S. Cl.
USPC .......... 358/1.12; 358/1.4; 358/1.15; 399/397; 399/361; 399/364; 399/381; 399/391; 399/45; 399/82; 347/16; 347/101; 347/104; 271/278; 271/287; 271/3.14; 271/3.19; 271/8.1

(58) Field of Classification Search
None
See application file for complete search history.

(56) References Cited

U.S. PATENT DOCUMENTS

| | | | | |
|---|---|---|---|---|
| 5,568,246 | A * | 10/1996 | Keller et al. | 399/382 |
| 8,351,840 | B2 * | 1/2013 | Mandel et al. | 399/381 |
| 2005/0024411 | A1 * | 2/2005 | Takenouchi et al. | 347/16 |
| 2005/0158094 | A1 * | 7/2005 | Mandel et al. | 399/391 |
| 2005/0158097 | A1 * | 7/2005 | Mandel et al. | 399/407 |
| 2005/0158098 | A1 * | 7/2005 | Mandel et al. | 399/407 |
| 2006/0039727 | A1 * | 2/2006 | Lofthus et al. | 399/381 |
| 2006/0039728 | A1 * | 2/2006 | deJong et al. | 399/381 |
| 2006/0039729 | A1 * | 2/2006 | Mandel et al. | 399/381 |
| 2006/0114313 | A1 * | 6/2006 | Moore | 347/262 |
| 2006/0176336 | A1 * | 8/2006 | Moore et al. | 347/41 |
| 2006/0221159 | A1 * | 10/2006 | Moore et al. | 347/101 |
| 2006/0222393 | A1 * | 10/2006 | de Jong et al. | 399/67 |
| 2007/0053711 | A1 * | 3/2007 | Litwiller | 399/82 |
| 2007/0081064 | A1 * | 4/2007 | Spencer et al. | 347/104 |
| 2007/0116479 | A1 * | 5/2007 | Mandel et al. | 399/9 |
| 2007/0120935 | A1 * | 5/2007 | Willis | 347/104 |
| 2007/0140767 | A1 * | 6/2007 | Mandel et al. | 399/381 |
| 2009/0146371 | A1 * | 6/2009 | Mandel et al. | 271/287 |
| 2009/0153884 | A1 * | 6/2009 | Lange et al. | 358/1.4 |

(Continued)

FOREIGN PATENT DOCUMENTS

| | | | |
|---|---|---|---|
| JP | 9-54465 | A | 2/1997 |
| JP | 2006-047843 | A | 2/2006 |

*Primary Examiner* — King Poon
*Assistant Examiner* — Ted Barnes
(74) *Attorney, Agent, or Firm* — Canon USA Inc IP Division

(57) ABSTRACT

An image forming apparatus includes a first image forming unit, a second image forming unit. In combined processing to perform two types of processing including one-sided image formation and two-sided image formation, if the one-sided image formation is performed, an image is formed on one side of the sheet by the second image forming unit. If there is an execution request for a job of one-sided image formation processing different from a combined job of the combined processing during execution of the combined job, the image formation control unit, while performing the one-sided image formation in the combined job of the combined processing by the second image forming unit, performs the one-sided image formation related to the execution request for the job of the one-sided image formation processing different from the combined job by the first image forming unit and then discharges from the intermediate discharge unit a sheet which has undergone the one-sided image formation processing in the job different from the combined job.

2 Claims, 13 Drawing Sheets

(56) References Cited

U.S. PATENT DOCUMENTS

| | | | | |
|---|---|---|---|---|
| 2009/0254910 | A1* | 10/2009 | Moore et al. | 718/102 |
| 2009/0263145 | A1* | 10/2009 | Mandel et al. | 399/9 |
| 2009/0267285 | A1* | 10/2009 | Willis | 271/3.14 |
| 2010/0067965 | A1* | 3/2010 | Bober et al. | 399/397 |
| 2010/0157351 | A1* | 6/2010 | Van De Capelle et al. | 358/1.15 |
| 2010/0196027 | A1* | 8/2010 | Strossman et al. | 399/45 |
| 2011/0019212 | A1* | 1/2011 | Wang et al. | 358/1.9 |
| 2011/0089627 | A1* | 4/2011 | Choi et al. | 271/109 |
| 2011/0135371 | A1* | 6/2011 | Mandel et al. | 400/611 |
| 2012/0032389 | A1* | 2/2012 | Choi et al. | 271/3.19 |

* cited by examiner

IMAGE FORMING APPARATUS

BACKGROUND OF THE INVENTION

1. Field of the Invention

The present invention relates to an image forming apparatus and more particularly to an image forming apparatus including a plurality of image forming units.

2. Description of the Related Art

Conventionally, an image forming apparatus is known which includes a plurality of (for example, two) image forming apparatuses coupled with each other to provide a plurality of image forming units. Such an image forming apparatus forms images in succession through the plurality of image forming units to improve the productivity in two-sided image formation processing (Japanese Patent Application Laid-Open No. 2006-47843 and Japanese Patent Application Laid-Open No. 9-54465).

For example, with an image forming apparatus discussed in Japanese Patent Application Laid-Open No. 2006-47843, a first image forming unit forms an image on the first side of a sheet and a second image forming unit forms an image on the second side of the sheet to maintain high productivity in two-sided image formation processing. The image forming apparatus discussed in Japanese Patent Application Laid-Open No. 2006-47843 eliminates the need of providing a sheet discharge processing apparatus for each of the image forming apparatuses coupled, thus saving more space than a case where a sheet discharge processing apparatus is provided for each image forming apparatus.

However, with the conventional image forming apparatus discussed in Japanese Patent Application Laid-Open No. 2006-47843, at the time of one-sided image formation processing during execution of a combined job including one-sided image formation and two-sided image formation, the second image forming unit allows a sheet to pass through without performing image formation thereon. More specifically, a first feed unit feeds a sheet, then the first image forming unit forms an image on the first side of the sheet and conveys it to the second image forming unit via an intermediate conveyance path. Then the second image forming unit allows the sheet to pass through without performing image formation thereon, and discharges the sheet. This operation is not a desirable form since it may shorten the life of the first and second image forming units. Japanese Patent Application Laid-Open No. 9-54465 discusses an image forming apparatus having two printers for printing both side of the sheet. With the image forming apparatus discussed in Japanese Patent Application Laid-Open No. 9-54465, at the time of one-sided image formation one of the two printers is operated. Japanese Patent Application Laid-Open No. 9-54465 does not discuss a combined job including one-sided image formation and two-sided image formation.

SUMMARY OF THE INVENTION

The present invention relates to an image forming apparatus capable of maintaining a high productivity in image formation processing while preventing the shortening of durable life of image forming units.

According to an aspect of the present invention, an image forming apparatus includes a first image forming unit, a second image forming unit disposed downstream of the first image forming unit in a sheet conveyance direction, an intermediate conveyance unit configured to convey a sheet on which an image is formed by the first image forming unit to the second image forming unit, an intermediate discharge unit which is branched from the intermediate conveyance unit and configured to discharge the sheet on which an image is formed by the first image forming unit, and an image formation control unit configured to control image formation processing by the first image forming unit and the second image forming unit, wherein, if one-sided image formation in combined processing to perform two types of processing including one-sided image formation and two-sided image formation is performed, the image formation control unit forms an image on one side of the sheet by the second image forming unit, wherein, if the two-sided image formation in the combined processing is performed, the image formation control unit forms an image on a first side of the sheet by the first image forming unit, and then forms an image on a second side of the sheet by the second image forming unit, wherein, if there is an execution request for a job of one-sided image formation processing different from a combined job of the combined processing during execution of the combined job, the image formation control unit, while performing the one-sided image formation in the combined job of the combined processing by the second image forming unit, performs the one-sided image formation related to the execution request for the job of the one-sided image formation processing different from the combined job by the first image forming unit and then discharges from the intermediate discharge unit a sheet which has undergone the one-sided image formation processing in the job different from the combined job.

When one-sided image formation processing in combined processing including one-sided and two-sided image formation is executed, the exemplary embodiment of the present invention can prevent the shortening of durable life of the image forming units by forming an image using a second image forming unit, and the exemplary embodiment of the present invention can maintain a high productivity in image formation processing by performing the one-sided image formation processing different from the combined processing while performing the one-sided image formation related to the combined processing by the second image forming unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

An image forming apparatus according to the following exemplary embodiments of the present invention includes two image forming apparatuses coupled with each other. Each of the two image forming apparatuses may be a copying machine, a printer, a facsimile, or a multifunction peripheral that has a two-sided printing function for printing an image on both sides of a sheet. The following exemplary embodiments will be described based on an image forming apparatus in which two high-speed monochrome printers are coupled with each other.

An image forming apparatus 1 according to a first exemplary embodiment of the present invention will be described below with reference to FIGS. 1 to 10. The entire structure of the image forming apparatus 1 according to the first exemplary embodiment will be described below with reference to FIGS. 1 to 3.

Figure 1:
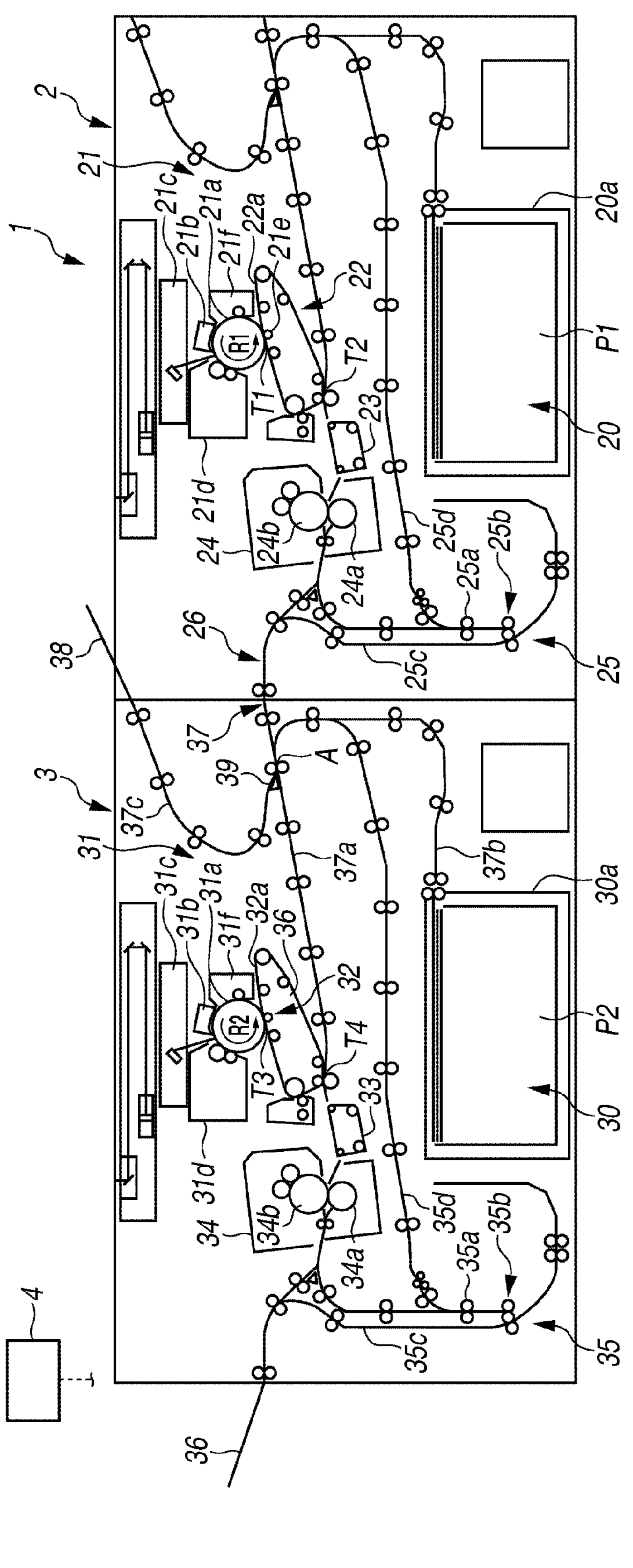
FIG. 1 is a cross sectional view schematically illustrating an entire structure of an image forming apparatus according to a first exemplary embodiment of the present invention.
Figure 2A:
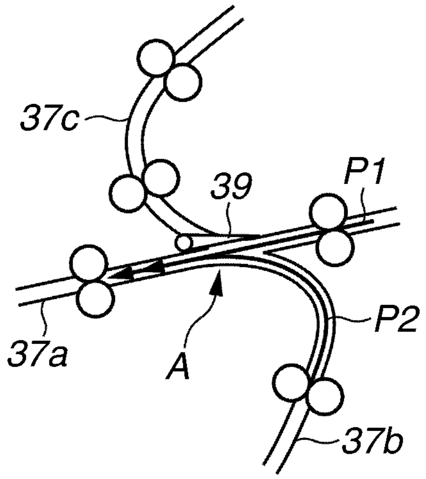
FIGS. 2A, 2B, and 2C illustrate switching members set to first, second, and third positions, respectively.
Figure 2B:
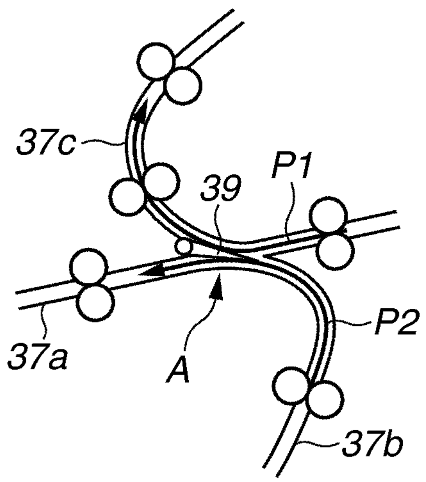
Figure 2C:
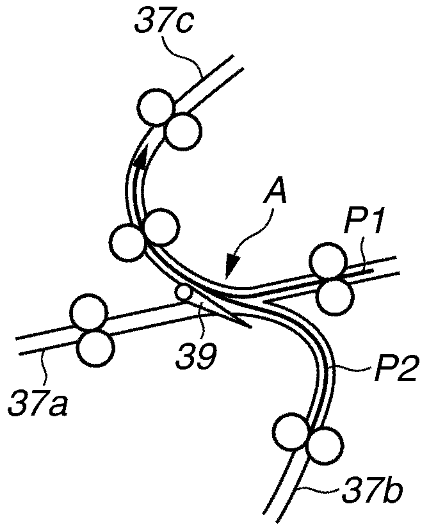
Figure 3:
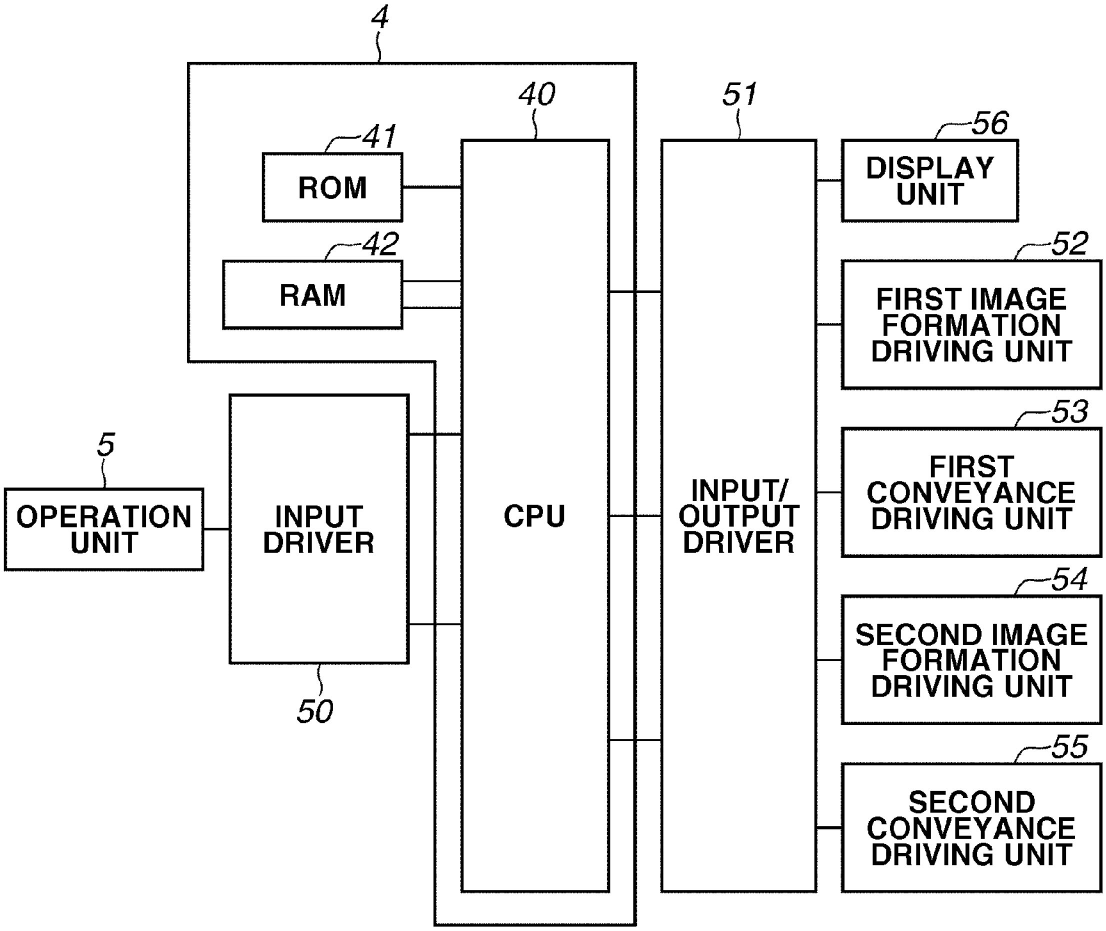
FIG. 3 is a block diagram illustrating an image formation control unit of the image forming apparatus according to the first exemplary embodiment.

FIG. 1 is a sectional view schematically illustrating the entire structure of the image forming apparatus 1 according to the first exemplary embodiment of the present invention. FIG. 2A illustrates a switching member 39 set to a first position. FIG. 2B illustrates the switching member 39 set to a second position. FIG. 2C illustrates the switching member 39 set to a third position. FIG. 3 is a block diagram illustrating an image formation control unit 4 of the image forming apparatus 1 according to the first exemplary embodiment.

As illustrated in FIGS. 1 and 2, the image forming apparatus 1 according to the first exemplary embodiment includes a first image forming apparatus 2, a second image forming apparatus 3 disposed on the downstream side of the first image forming apparatus 2, and the image formation control unit 4 for controlling the first image forming apparatus 2 and the second image forming apparatus 3. The first image forming apparatus 2 and the second image forming apparatus 3 are coupled with each other so that a sheet with an image formed thereon by the first image forming apparatus 2 can be delivered to the second image forming apparatus 3.

The first image forming apparatus 2 further includes a first feed unit 20 for feeding a sheet P1, a first image forming unit 21 for forming an image on the sheet P1 fed from the first feed unit 20, and a transfer unit 22 for transferring the image onto the sheet P1. The first image forming apparatus 2 further includes a pre-fixing conveyance belt unit 23, a fixing unit 24 for fixing the image onto the sheet P1, a reversing unit 25 for reversing the front and back sides of the sheet P1, and a sheet discharge unit 26 for delivering the sheet P1 with the image formed thereon to the second image forming apparatus 3. Although the first feed unit 20, the first image forming unit 21, and the transfer unit 22 are connected via predetermined conveyance paths, descriptions of the conveyance paths will be omitted.

The first feed unit 20 includes a sheet feed deck 20*a* for storing the sheets P1, and the sheet P1 is fed from the sheet feed deck 20*a*. Based on predetermined image information, the first image forming unit 21 forms an image on the sheet P1 fed from the first feed unit 20. The first image forming unit 21 includes a photosensitive drum 21*a*, a corona charging unit 21*b*, an exposure unit 21*c*, a development unit 21*d*, a primary transfer roller 21*e*, and a toner collecting unit 21*f*. The photosensitive drum 21 is formed by a metal cylinder having a negatively charged photosensitive layer formed on its surface, and rotates in a predetermined direction (the direction indicated by an arrow R1 illustrated in FIG. 1).

The corona charging unit 21*b* uniformly charges the surface of the photosensitive drum 21*a* that serves as an image bearing member. The exposure unit 21*c* irradiates the photosensitive drum 21*a* with a laser beam based on the image information to form an electrostatic latent image on the photosensitive drum 21*a*. The development unit 21*d* applies toner to the electrostatic latent image to visualize it as a toner image. At a primary transfer section T1, the primary transfer roller 21*e* transfers the toner image from the photosensitive drum 21*a* onto an intermediate transfer belt 22*a*, which is described below. After transferring the toner image, the toner collecting unit 21*f* removes residual toner from the surface of the photosensitive drum 21*a*.

The transfer unit 22 includes the intermediate transfer belt 22*a* onto which the toner image is transferred. The intermediate transfer belt 22*a* transfers the toner image onto the sheet P1 at a secondary transfer section T2. The pre-fixing conveyance belt unit 23 conveys the sheet P1 from the secondary transfer section T2 to the fixing unit 24. The fixing unit 24 includes a pressure roller 24*a* and a fixing roller 24*b* for applying heat and pressure to the transferred toner image to fix it onto the sheet P1.

The sheet discharge unit 26 forms an intermediate conveyance unit for delivering the sheet P1 with the toner image fixed thereon by the fixing unit 24 to the second image forming apparatus 3. The reversing unit 25 includes a first reversing path 25*a* branched from the sheet discharge unit 26, a reversing roller pair 25*b* rotatable in the forward and reverse directions, a second reversing path 25*c* connected to the sheet discharge unit 26, and a third reversing path 25*d* connected to the first image forming unit 21. The reversing unit 25 reverses the front and back sides of the sheet P1 with the toner image fixed thereon by the fixing unit 24, and conveys the sheet P1 to the sheet discharge unit 26 or the first image forming unit 21.

The second image forming apparatus 3 includes a second feed unit 30 for feeding a sheet P2, a second image forming unit 31 for forming an image on the sheet P2 fed from the second feed unit 30, and a transfer unit 32 for transferring the image onto the sheet P2. The second image forming apparatus 3 further includes a pre-fixing conveyance belt unit 33, a fixing unit 34 for fixing the image onto the sheet P2, a reversing unit 35 for reversing the front and back sides of the sheet P2, and a sheet discharge unit 36 for discharging the sheet P2 with the image formed thereon. The second image forming apparatus 3 further includes a sheet receiving unit 37 and an intermediate sheet discharge tray 38 serving as an intermediate sheet discharge unit. Although the second feed unit 30, the second image forming unit 31, the transfer unit 32, etc. are connected via predetermined conveyance paths similarly to the first image forming apparatus 2, descriptions of the conveyance paths will be omitted.

The second feed unit 30 includes a sheet feed deck 30*a* for storing the sheets P2 from which the sheet P2 is fed. Based on predetermined image information, the second image forming unit 31 forms an image on the sheet P2 fed from the second feed unit 30. The second image forming unit 31 includes a photosensitive drum 31*a*, a corona charging unit 31*b*, an exposure unit 31*c*, a development unit 31*d*, a primary transfer roller 31*e*, and a toner collecting unit 31*f*. The photosensitive drum 31*a* is formed by a metal cylinder having a negatively charged photosensitive layer formed on its surface, and rotates in a predetermined direction (the direction indicated by an arrow R2 illustrated in FIG. 1).

The corona charging unit 31*b* uniformly charges the surface of the photosensitive drum 31*a* that serves as an image bearing member. The exposure unit 31*c* irradiates the photosensitive drum 31*a* with a laser beam based on the image information to form an electrostatic latent image on the photosensitive drum 31*a*. The development unit 31*d* applies toner to the electrostatic latent image to visualize it as a toner image. At a primary transfer section T3, the primary transfer roller 31*e* transfers the toner image from the photosensitive drum 31*a* onto an intermediate transfer belt 32*a*, which is described below. After transferring the toner image, the toner collecting unit 31*f* removes residual toner from the surface of the photosensitive drum 31*a*.

The transfer unit 32 includes the intermediate transfer belt 32*a* onto which the toner image is transferred. The intermediate transfer belt 32*a* transfers the toner image onto the sheet P2 at a secondary transfer section T4. The pre-fixing conveyance belt unit 33 conveys the sheet P2 from the secondary transfer section T4 to the fixing unit 34. The fixing unit 34 includes a pressure roller 34*a* and a fixing roller 34*b* for applying heat and pressure to the transferred toner image to fix it onto the sheet P2.

When the toner image is fixed onto the sheet P1 or P2 by the fixing unit 34, the sheet discharge unit 36 discharges the sheet P1 with the images formed on both sides or the sheet P2 with the image formed on one side. The reversing unit 35 includes a first reversing path 35*a* branched from the sheet discharge unit 36, a reversing roller pair 35*b* rotatable in the forward and reverse directions, a second reversing path 35*c* connected to the sheet discharge unit 36, and a third reversing path 35*d* connected to the second image forming unit 31. The reversing unit 35 reverses the front and back sides of the sheet P1 or P2 with the toner image fixed thereon by the fixing unit 34, and conveys the sheet P1 to the sheet discharge unit 26 or the second image forming unit 31.

The sheet receiving unit 37 coupled with the sheet discharge unit 26 forms the intermediate conveyance unit for receiving the sheet P1 with the image formed thereon by the first image forming unit 21 and conveying the sheet P1 to the second image forming unit 31. The sheet receiving unit 37 includes a conveyance path 37*a* coupled with the sheet discharge unit 26, a sheet feed path 37*b* for feeding the sheet P2 stored in the second feed unit 30, a sheet discharge path 37*c* branched from the conveyance path 37*a* and connected to the intermediate sheet discharge tray 38, and a switching member 39.

As illustrated in FIGS. 2A to 2C, the conveyance path 37*b* and the sheet discharge path 37*c* are connected to the conveyance path 37*a* at a branch point A provided on the conveyance path 37*a*. The switching member 39 is disposed at the branch point A. The switching member 39 is rotatably arranged so that it can be set to any one of a first position illustrated in FIG. 2A, a second position illustrated in FIG. 2B, and a third position illustrated in FIG. 2C to selectively block the conveyance path 37*a*, the sheet feed path 37*b*, or the sheet discharge path 37*c* at the branch point A.

More specifically, when the switching member 39 is set to the first position, the sheet discharge path 37*c* is blocked, and the sheet P1 conveyed from the sheet discharge unit 26 and the sheet P2 fed from the second feed unit 30 are conveyed to the conveyance path 37*a*. Further, when the switching member 39 is set to the second position, the conveyance path 37*a* at the branch point A is blocked, and the sheet P1 conveyed from the sheet discharge unit 26 is conveyed to the conveyance path 37*c* and the sheet P2 fed from the second feed unit 30 is conveyed to the conveyance path 37*a*.

Furthermore, when the switching member 39 is set to the third position, the conveyance path 37*a* at the branch point A is blocked, and the sheet P1 conveyed from the sheet discharge unit 26 and the sheet P2 fed from the second feed unit 30 are conveyed to the sheet discharge path 37*c*. The switching member 39 is driven by a pulse motor (not illustrated), and controlled by the image formation control unit 4, which is described below, so that the switching member 39 is set to any one of the first, second, and third positions.

The intermediate sheet discharge tray 38 connected to the sheet discharge path 37*c* stores the sheet P1 with the image formed thereon by the first image forming unit 21.

As illustrated in FIG. 3, the image formation control unit 4 includes a central processing unit (CPU) 40, a read-only memory (ROM) 41 for storing a control program, and a random access memory (RAM) 42 used as an area for temporarily storing control data and as a work area for control-related calculations. According to the control program stored in the ROM 41 and a setting input from an operation unit 5 via an input driver 50, the CPU controls a first image formation driving unit 52, a first conveyance driving unit 53, a second image formation driving unit 54, and a second conveyance driving unit 55 via an input/output driver 51. The setting input from the operation unit 5 is displayed on a display unit 56.

The first image formation driving unit 52 collectively means units for forming an image by the first image forming unit 21, and the first conveyance driving unit 53 collectively means units for feeding a sheet from the first feed unit 20. The second image formation driving unit 54 collectively means units for forming an image by the second image forming unit 31, and the second conveyance driving unit 55 collectively means units for feeding a sheet from the second feed unit 30.

Figure 4:
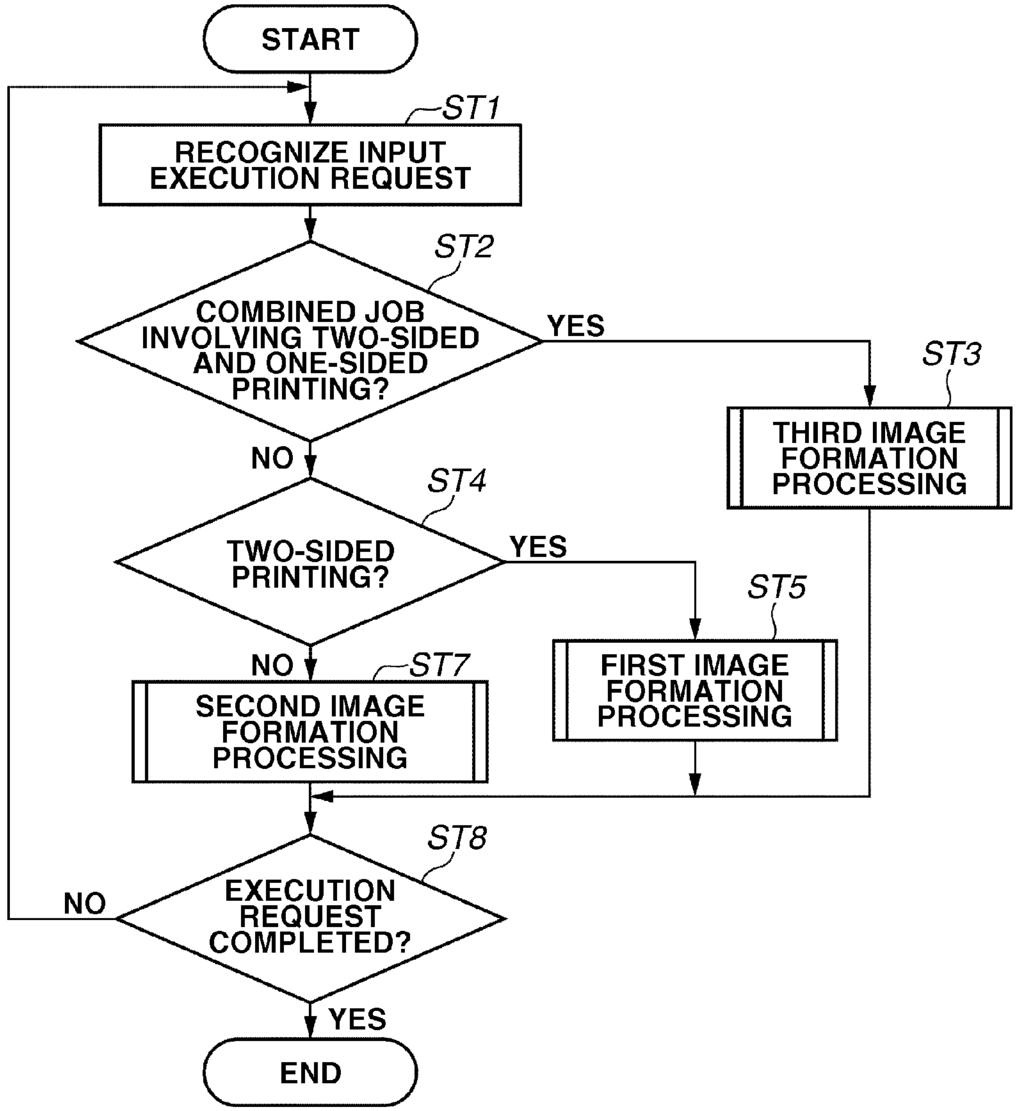
FIG. 4 is a flow chart illustrating control processing performed by the image formation control unit of the image forming apparatus according to the first exemplary embodiment.

Control processing performed by the image formation control unit 4 of the image forming apparatus 1 according to the first exemplary embodiment will be described below with reference to FIGS. 4 to 10. Main control processing performed by the image formation control unit 4 will be described below with reference to FIG. 4. FIG. 4 is a flow chart illustrating control processing performed by the image formation control unit 4 of the image forming apparatus 1 according to the first exemplary embodiment.

Referring to FIG. 4, in step ST1, when a user inputs an execution request (job) from the operation unit 5, the image formation control unit 4 first recognizes the execution request (job) input by the user. In step ST2, after recognizing the execution request (job) from the user, the image formation control unit 4 determines whether the execution request (job) is a combined job including two-sided image printing and one-sided image printing.

When the execution request (job) is the combined job including two-sided image printing and one-sided image printing (YES in step ST2), the processing proceeds to step ST3. In step ST3, the image formation control unit 4 performs third image formation processing which is combined processing including two-sided image printing and one-sided image printing. On the other hand, when the execution request (job) is not the combined job including two-sided image printing and one-sided image printing (NO in step ST2), the processing proceeds to step ST4.

In step ST4, the image formation control unit 4 determines whether the execution request (job) includes two-sided image printing. When the execution request (job) includes two-sided printing (YES in step ST4), the processing proceeds to step ST5. In step ST5, the image formation control unit 4 performs first image formation processing which is two-sided image formation processing. On the other hand, when the execution request (job) does not include two-sided printing (NO in step ST4), the processing proceeds to step ST7. In step ST7, the image formation control unit 4 performs second image formation processing which is one-sided image formation processing.

Upon completion of the first, second, or third image formation processing, in step ST8, the image formation control unit 4 determines whether the execution request (job) from the user is completed. When the execution request (job) is completed (YES in step ST8), the processing (control operation) ends. Whereas, if the execution request (job) is not completed (NO in step ST8), the processing returns to step ST1 and then repeats the above-described steps.

Figure 5:
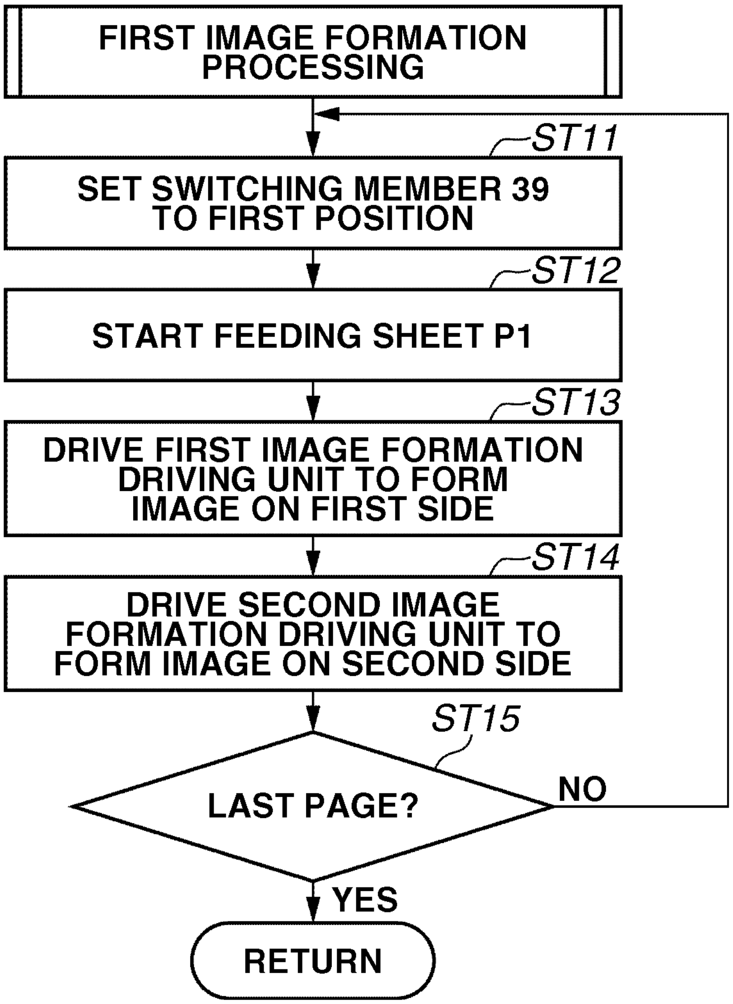
FIG. 5 is a flow chart illustrating first image formation processing performed by the image formation control unit according to the first exemplary embodiment.
Figure 6:
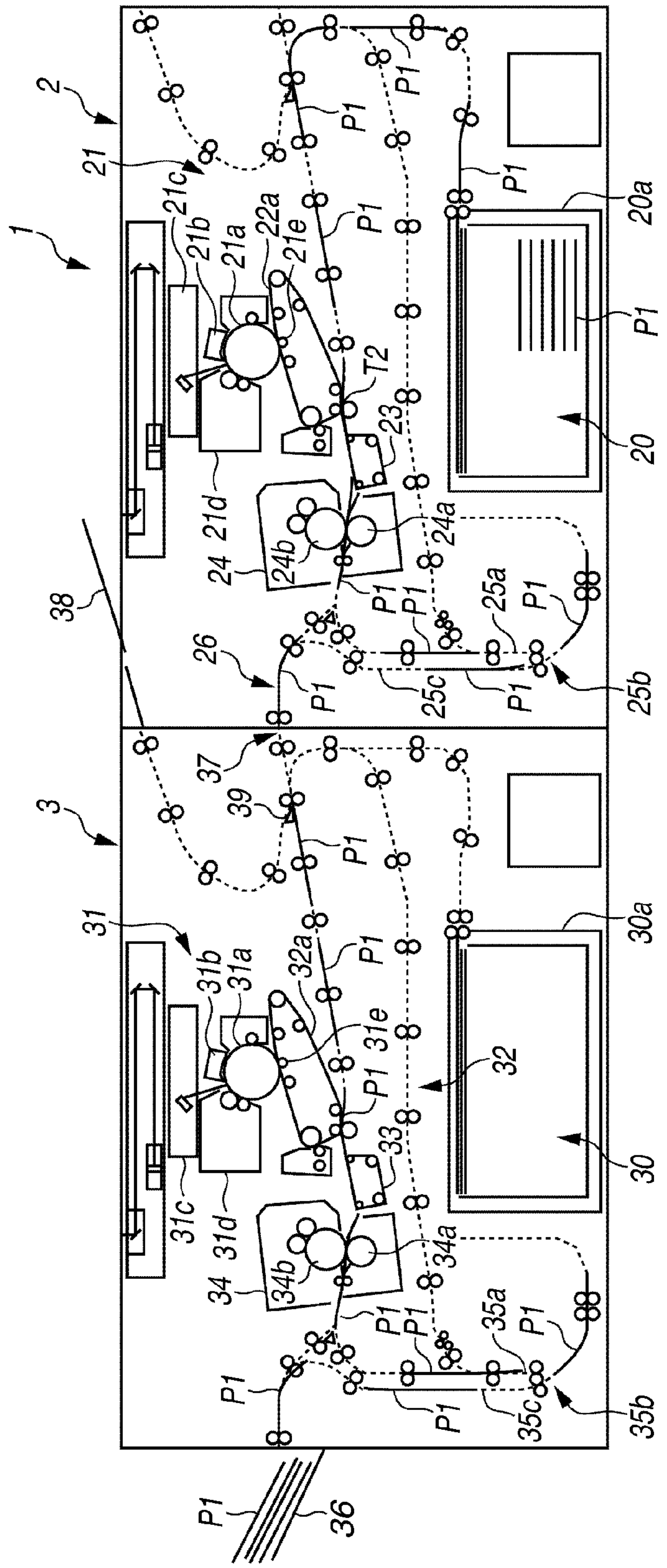
FIG. 6 illustrates a sheet flow in the first image formation processing according to the first exemplary embodiment.

The first image formation processing that is two-sided image formation processing will be described below, along with a flow of the sheet P1, with reference to FIGS. 5 and 6. FIG. 5 is a flow chart illustrating the first image formation processing performed by the image formation control unit 4 according to the first exemplary embodiment. FIG. 6 illustrates a flow of the sheet in the first image formation processing according to the first exemplary embodiment.

Referring to FIG. 5, in step ST11, when the first image formation processing is started, the image formation control unit 4 sets the switching member 39 to the first position (refer to FIG. 2A). In step ST12, the image formation control unit 4 drives the first conveyance driving unit 53 to start feeding the sheet P1. More specifically, as illustrated in FIG. 6, the sheet P1 is picked up from the sheet feed deck 20*a* one by one and conveyed by a roller pair, and the image formation control unit 4 makes the sheet P1 wait before the secondary transfer section T2 by a registration roller (not illustrated).

In step ST13, the image formation control unit 4 drives the first image formation driving unit 52 to form an image on the first side (one side) of the sheet P1. More specifically, the corona charging unit 21*b* uniformly charges the surface of the photosensitive drum 21*a* and, based on image information, the exposure unit 21*c* irradiates the surface of the photosensitive drum 21*a* with a laser beam to form an electrostatic latent image on the photosensitive drum 21*a*. Then, the development unit 21*d* applies toner to the electrostatic latent image to visualize it as a toner image. The primary transfer roller 21*e* primarily transfers the toner image from the photosensitive drum 21*a* onto the intermediate transfer belt 22*a*.

The sheet P1 kept waiting by the registration roller is sent out to the secondary transfer section T2 at a predetermined timing. The toner image primarily transferred onto the intermediate transfer belt 22*a* is then secondarily transferred onto the sheet P1. The pre-fixing conveyance belt unit 23 conveys the sheet P1 with the toner image secondarily transferred thereon from the secondary transfer section T2 to the fixing unit 24. The pressure roller 24*a* and the fixing roller 24*b* apply heat and pressure to the transferred toner image to fix it.

After the sheet P1 with the toner image formed on the first side is conveyed to the first reversing path 25*a*, the image formation control unit 4 reversely rotates the reversing roller pair 25*b* to reverse the front and back sides of the sheet P1. The sheet P1 with the front and back sides reversed is conveyed to the sheet discharge unit 26 via the second reversing path 25*c*. The sheet P1 conveyed to the sheet discharge unit 26 is received by the sheet receiving unit 37, and then conveyed to the second image forming unit 31 by the switching member 39.

When the sheet P1 is conveyed to the second image forming apparatus 3 via the sheet receiving unit 37 and the switching member 39, the image formation control unit 4 makes the sheet P1 wait before the secondary transfer section T4 by a registration roller (not illustrated).

In step ST14, the image formation control unit 4 drives the second image formation driving unit 54 to form an image on the second side of the sheet P1. More specifically, the corona charging unit 31*b* uniformly charges the surface of the photosensitive drum 31*a* and, based on image information, the exposure unit 31*c* irradiates the surface of the photosensitive drum 31*a* with a laser beam to form an electrostatic latent image on the photosensitive drum 31*a*. Then, the development unit 31*d* applies toner to the electrostatic latent image to visualize it as a toner image. The primary transfer roller 31*e* primarily transfers the toner image from the photosensitive drum 31*a* onto the intermediate transfer belt 32*a*.

The sheet P1 kept waiting by the registration roller is sent out to the secondary transfer section T4 at a predetermined timing. At the secondary transfer section T4, the toner image primarily transferred onto the intermediate transfer belt 32*a* is then secondarily transferred onto the second side of the sheet P1. The pre-fixing conveyance belt unit 33 conveys the sheet P1 with the toner image secondarily transferred thereon from the secondary transfer section T4 to the fixing unit 34. The pressure roller 34*a* and the fixing roller 34*b* apply heat and pressure to the transferred toner image to fix it.

After the sheet P1 with the toner image formed on the second side is conveyed to the first reversing path 35*a*, the image formation control unit 4 reversely rotates the reversing roller pair 35*b* to reverse the front and back sides of the sheet P1 (the first side becomes the front side). Then, the sheet P1 is stacked on the sheet discharge unit 36 via the second reversing path 35*c*. In step ST15, the image formation control unit 4 determines whether all of two-sided printing related to the execution request (job) is completed (whether printing for the last page is completed). When the image formation control unit 4 determines that the printing is not all completed (NO in step ST15), the processing returns to step ST11. On the other hand, when the image formation control unit 4 determines that the printing is all completed (YES in step ST15), the first image formation processing ends, and then the processing returns to the main control operation of the image formation control unit 4.

Figure 7:
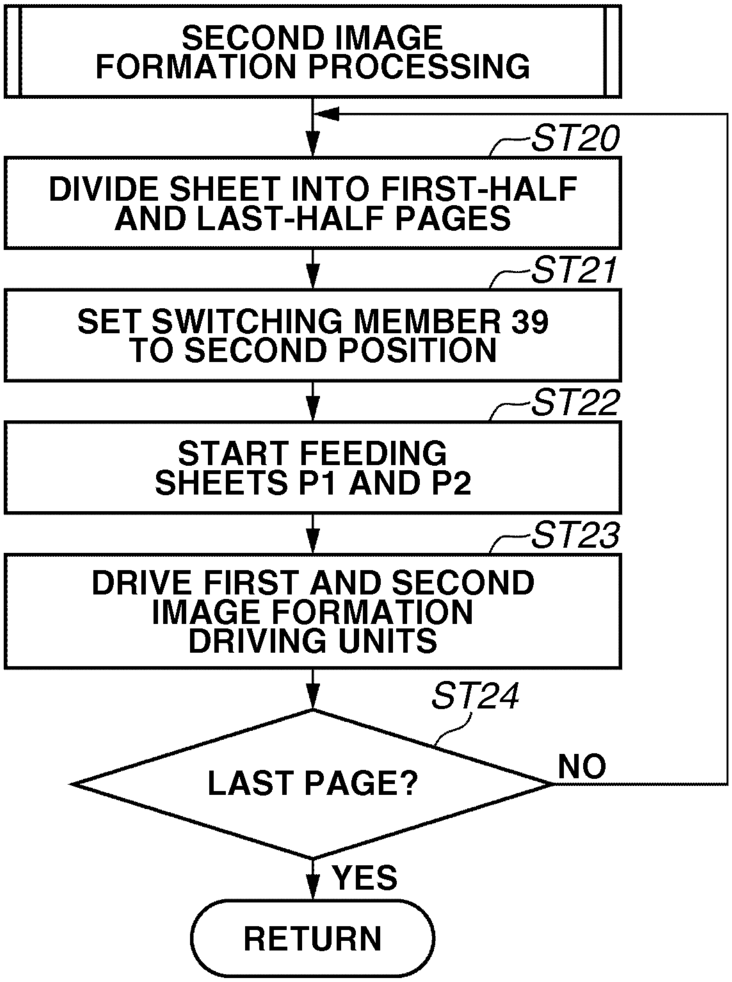
FIG. 7 is a flow chart illustrating second image formation processing performed by the image formation control unit according to the first exemplary embodiment.
Figure 8:
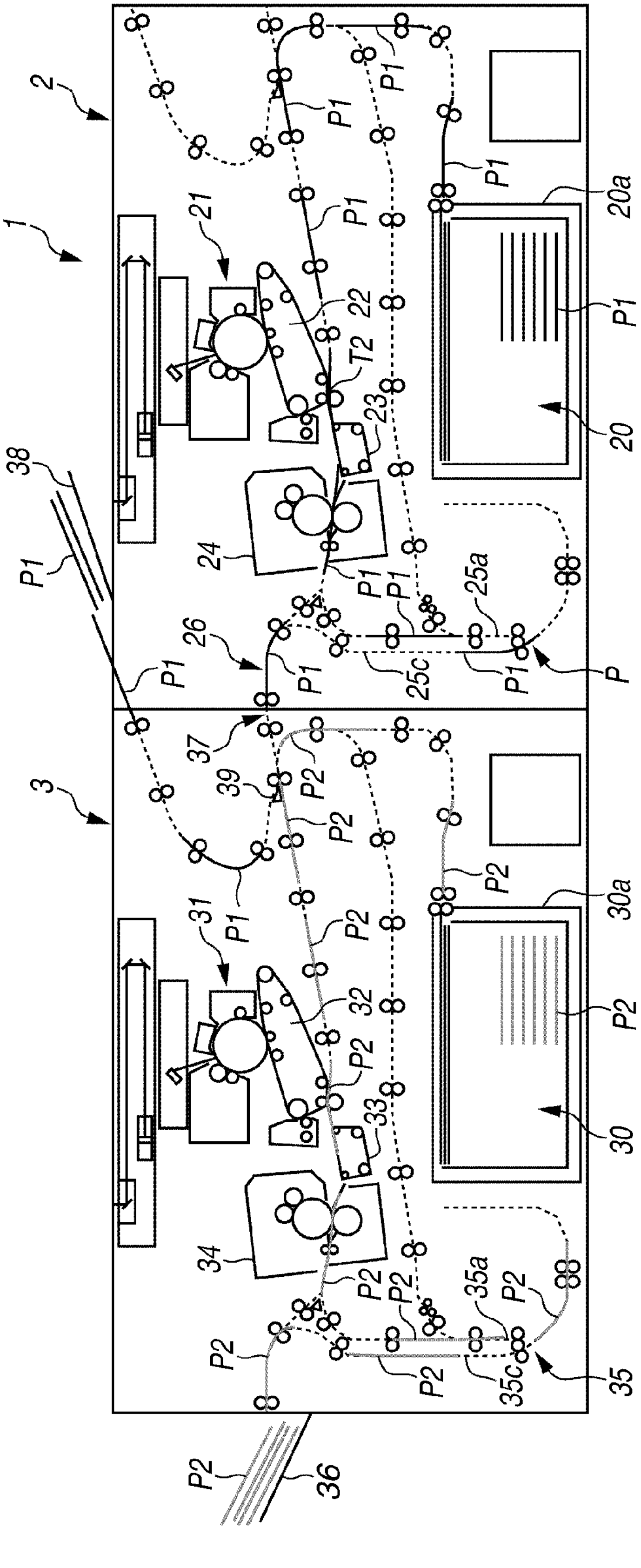
FIG. 8 illustrates a sheet flow in the second image formation processing according to the first exemplary embodiment.

Then, the second image formation processing that is one-sided image formation processing will be described below, along with a flow of the sheet P1, with reference to FIGS. 7 and 8. FIG. 7 is a flow chart illustrating the second image formation processing performed by the image formation control unit 4 according to the first exemplary embodiment. FIG. 8 illustrates a flow of the sheet P1 in the second image formation processing according to the first exemplary embodiment.

Since the second image formation processing is one-sided image formation processing, the image formation processing performs image formation only once. Therefore, in the one-sided image formation processing, the first image forming apparatus 2 and the second image forming apparatus 3 can be operated as independent image forming apparatuses.

In the present exemplary embodiment, the image formation control unit 4 divides a bundle of sheets subjected to the image formation processing into first-half and last-half pages. The first image forming apparatus 2 performs one-sided image formation on the first-half pages, and the second image forming apparatus 3 performs one-sided image formation on the last-half pages. The image formation processing will be described in detail below. Since operations of the first image formation driving unit 52, the first conveyance driving unit 53, the second image formation driving unit 54, and the second conveyance driving unit 55 are similar to those in the first image formation processing, descriptions thereof will be omitted.

Referring to FIG. 7, in step ST20, when the second image formation processing is started, the image formation control unit 4 divides sheets subjected to image formation into first- and last-half pages based on an input execution request (job). For example, when the execution request (job) includes a total of 100 pages, the image formation control unit 4 divides the execution request (job) into first-half pages (pages 1 to 50) and last-half pages (pages 51 to 100). After dividing the execution request (job) into the first-half pages and the last-half pages, the image formation control unit 4 distributes them to the first image forming unit 21 and the second image forming unit 31, respectively.

In step ST21, the image formation control unit 4 sets the switching member 39 to the second position (refer to FIG. 2B). After setting the switching member 39 to the second position, in step ST22, the image formation control unit 4 drives the first conveyance driving unit 53 and the second conveyance driving unit 55 to start feeding the sheets P1 and P2, respectively, as illustrated in FIG. 8. In step ST23, the image formation control unit 4 drives the first image formation driving unit 52 and the second image formation driving unit 54 to form an image on the first side (one side) of the sheets P1 and P2, respectively.

After the sheets P1 and P2 with a toner image formed on the first side are conveyed to the first reversing paths 25*a* and 35*a*, respectively, the image formation control unit 4 reversely rotates the reversing roller pairs 25*b* and 35*b* to reverse the front and back sides of the sheets P1 and P2 (the first side becomes the backside). The sheet P1 with the front and back sides reversed is conveyed to the sheet discharge unit 26 via the second reversing path 25*c*, received by the sheet receiving unit 37, conveyed to the sheet discharge path 37*c* by the switching member 39 set to the second position, and then stacked on the intermediate sheet discharge tray 38. On the other hand, the sheet P2 with the front and back sides reversed is stacked on the sheet discharge unit 36 via the second reversing path 35*c*.

In step ST24, the image formation control unit 4 determines whether all of two-sided printing related to the execution request (job) are completed (whether printing for the last page is completed). When the image formation control unit 4 determines that the printing is not all completed (NO in step ST24), the processing returns to step ST20. On the other hand, when the image formation control unit 4 determines that the printing is all completed (YES in step ST24), the second image formation processing ends, and then the processing returns to the main control operation of the image formation control unit 4.

Figure 9:
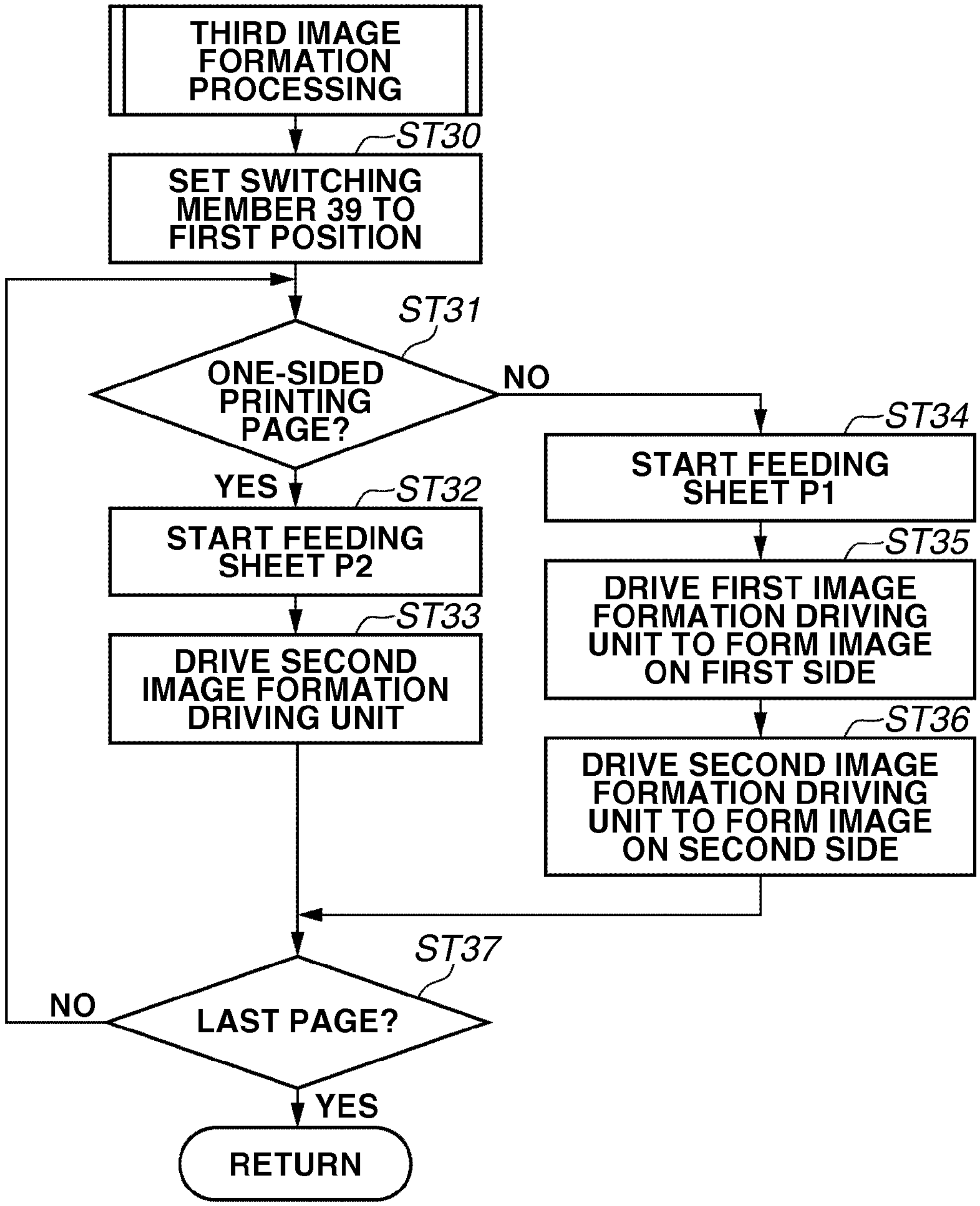
FIG. 9 is a flow chart illustrating third image formation processing performed by the image formation control unit according to the first exemplary embodiment.
Figure 10:
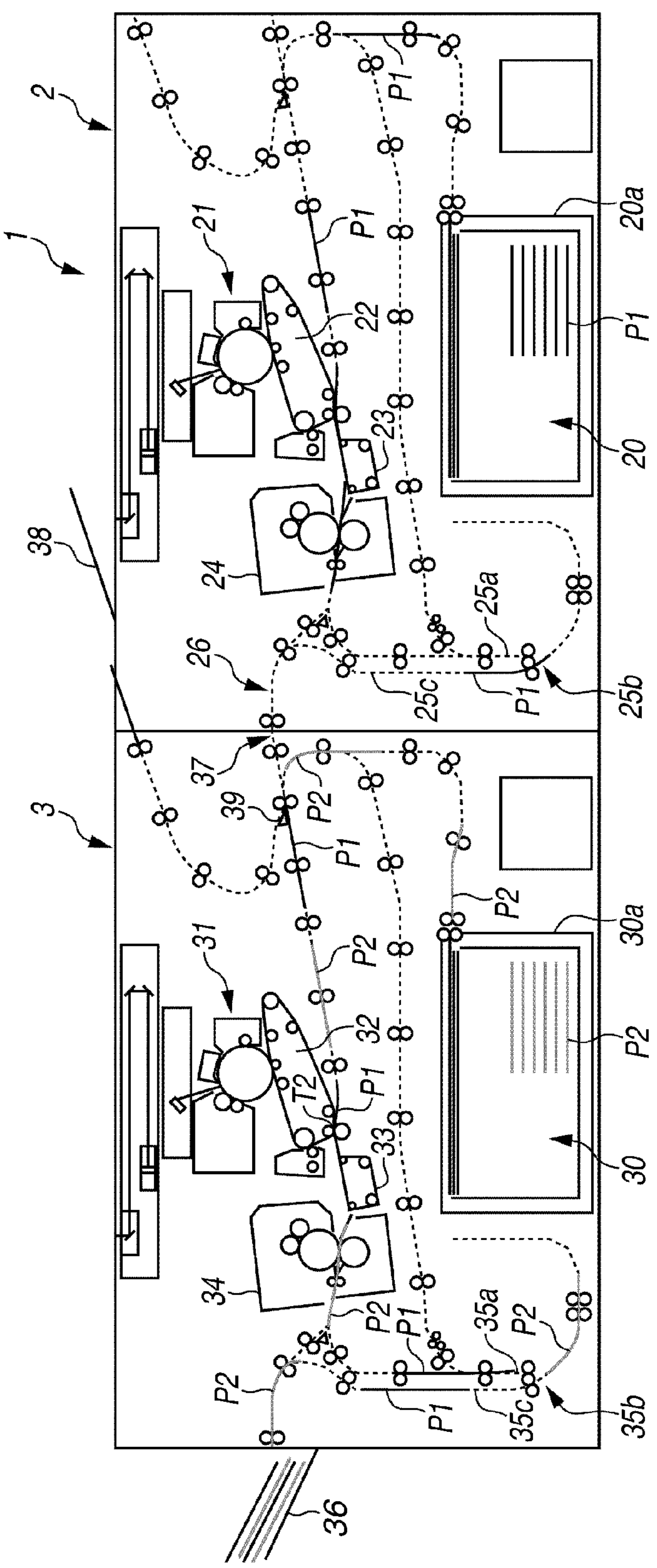
FIG. 10 illustrates a sheet flow in the third image formation processing according to the first exemplary embodiment.

The third image formation processing which is combined processing including one-sided image formation processing and two-sided image formation processing will be described below, along with a flow of the sheet P1, with reference to FIGS. 9 and 10. FIG. 9 is a flow chart illustrating the third image formation processing performed by the image formation control unit 4 according to the first exemplary embodiment. FIG. 10 illustrates a flow of the sheets in the third image formation processing according to the first exemplary embodiment. Since operations of the first image formation driving unit 52, the first conveyance driving unit 53, the second image formation driving unit 54, and the second conveyance driving unit 55 are similar to those in the first image formation processing, descriptions thereof will be omitted.

Referring to FIGS. 9 and 10, in step ST30, when the third image formation processing is started, the image formation control unit 4 sets the switching member 39 to the first position (refer to FIG. 2A). After setting the switching member 39 to the first position, in step ST31, the image formation control unit 4 determines whether the current page is subjected to one-sided image formation processing.

When the current page is subjected to one-sided image formation processing (YES in step ST31), the processing proceeds to step ST32. In step ST32, the image formation control unit 4 drives the second conveyance driving unit 55 to start feeding the sheet P2. Then in step ST33, the image formation control unit 4 drives the second image formation driving unit 54 to form an image on the first side (one side) of the sheet P2. After the sheet P2 with the image formed on the first side is conveyed to the first reversing path 35*a*, the image formation control unit 4 reversely rotates the reversing roller pair 35*b* to reverse the front and back sides of the sheet P2 (the second side becomes the front side). Then, the sheet P2 is stacked on the sheet discharge unit 36 via the second reversing path 35*c*.

On the other hand, when the image formation control unit 4 determines that the current page is not subjected one-sided image formation processing, i.e., it is subjected to two-sided image formation processing (NO in step ST31), the processing proceeds to step ST34. In step ST34, the image formation control unit 4 drives the first conveyance driving unit 53 to start feeding the sheet P1. In step ST35, the image formation control unit 4 drives the first image formation driving unit 52 to form an image on the first side (one side) of the sheet P1. After completion of image formation on the first side of the sheet P1, the image formation control unit 4 reversely rotates the reversing roller pair 25*b* to reverse the front and back sides of the sheet P1. Then, the sheet P1 is conveyed to the second image forming unit 31 via the second reversing path 25*c*, the sheet discharge unit 26, and the sheet receiving unit 37.

In step ST36, the image formation control unit 4 drives the second image formation driving unit 54 to form an image on the second side of the sheet P1. After the sheet P1 with the image formed on the second side is conveyed to the first reversing path 35*a*, the image formation control unit 4 reversely rotates the reversing roller pair 35*b* to reverse the front and back sides of the sheet P1 (the first side becomes the front side). Then, the sheet P1 is stacked on the sheet discharge unit 36 via the second reversing path 35*c*.

In step ST37, the image formation control unit 4 determines whether all of printing related to the execution request (job) is completed (whether printing for the last page is completed). When the image formation control unit 4 determines that the printing is not all completed (NO in step ST37), the processing returns to step ST31. On the other hand, when the image formation control unit 4 determines that the printing is all completed (YES in step ST37), the third image formation processing ends, and then the processing returns to the main control operation of the image formation control unit 4.

The thus-configured image forming apparatus 1 according to the first exemplary embodiment has the following effects.

When performing one-sided image formation processing in combined processing (combined job) including one-sided image formation processing and two-sided image formation processing, the image forming apparatus 1 according to the first exemplary embodiment performs one-sided image formation processing using the second image forming unit. This configuration can prevent a sheet from passing through the second image forming unit without being subjected to image formation in the one-sided image formation processing. Thus, the shortening of durable life of the image forming unit can be prevented.

Further, the image forming apparatus 1 forms an image on the first side of the sheet by the first image forming unit and then forms an image on the second side of the sheet by the second image forming unit, thus high productivity in two-sided image formation processing can be maintained. As a result, the image forming apparatus 1 according to the present exemplary embodiment can prevent the shortening of durable life of the image forming unit while maintaining high productivity in two-sided image formation processing.

Further, the image forming apparatus 1 according to the first exemplary embodiment does not need to provide a sheet discharge processing apparatus for each image forming apparatus coupled, thus space can be saved more than a case where a sheet discharge processing apparatus is provided for each image forming apparatus.

The image forming apparatus 1 according to the first exemplary embodiment includes the switching member 39 that can be selectively set to any one of the first, second, and third positions. Therefore, the sheets P1 and P2 can be selectively distributed, for example, by the intermediate conveyance unit (the sheet discharge unit 26 and the sheet receiving unit 37) connecting the image forming apparatus 2 and the image forming apparatus 3. Thus, the first, second, and third image formation processing can be easily performed with a simple configuration. With the switching member 39 set to the third position, it becomes possible, for example when the sheet P2 causes double feed, to stop the image forming apparatus 1 and discharge the double-fed sheet P2 to the outside of the image forming apparatus 1 without degrading productivity.

Figure 11:
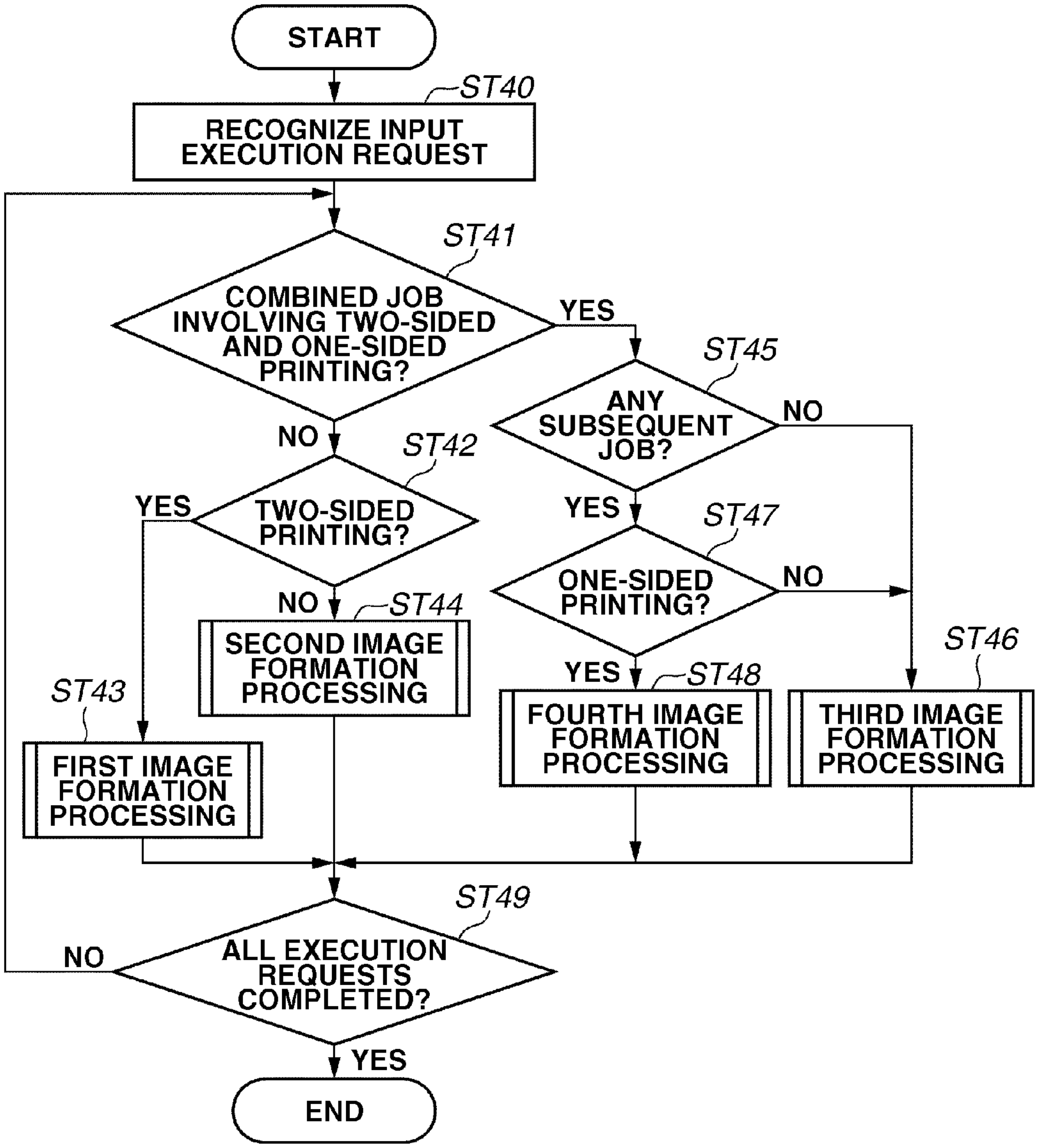
FIG. 11 is a flow chart illustrating control processing performed by an image formation control unit of an image forming apparatus according to a second exemplary embodiment.
Figure 12:
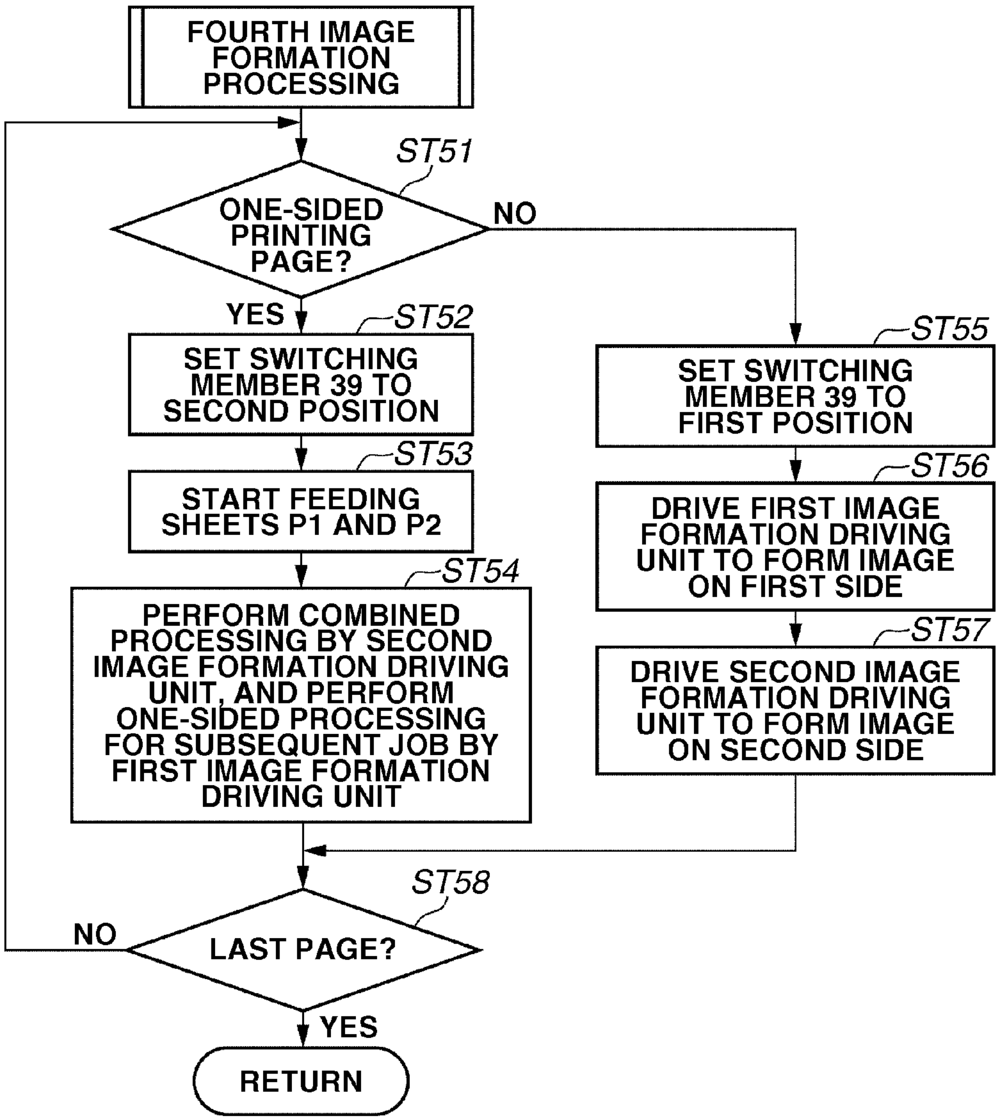
FIG. 12 is a flow chart illustrating fourth image formation processing performed by the image formation control unit according to the second exemplary embodiment.
Figure 13:
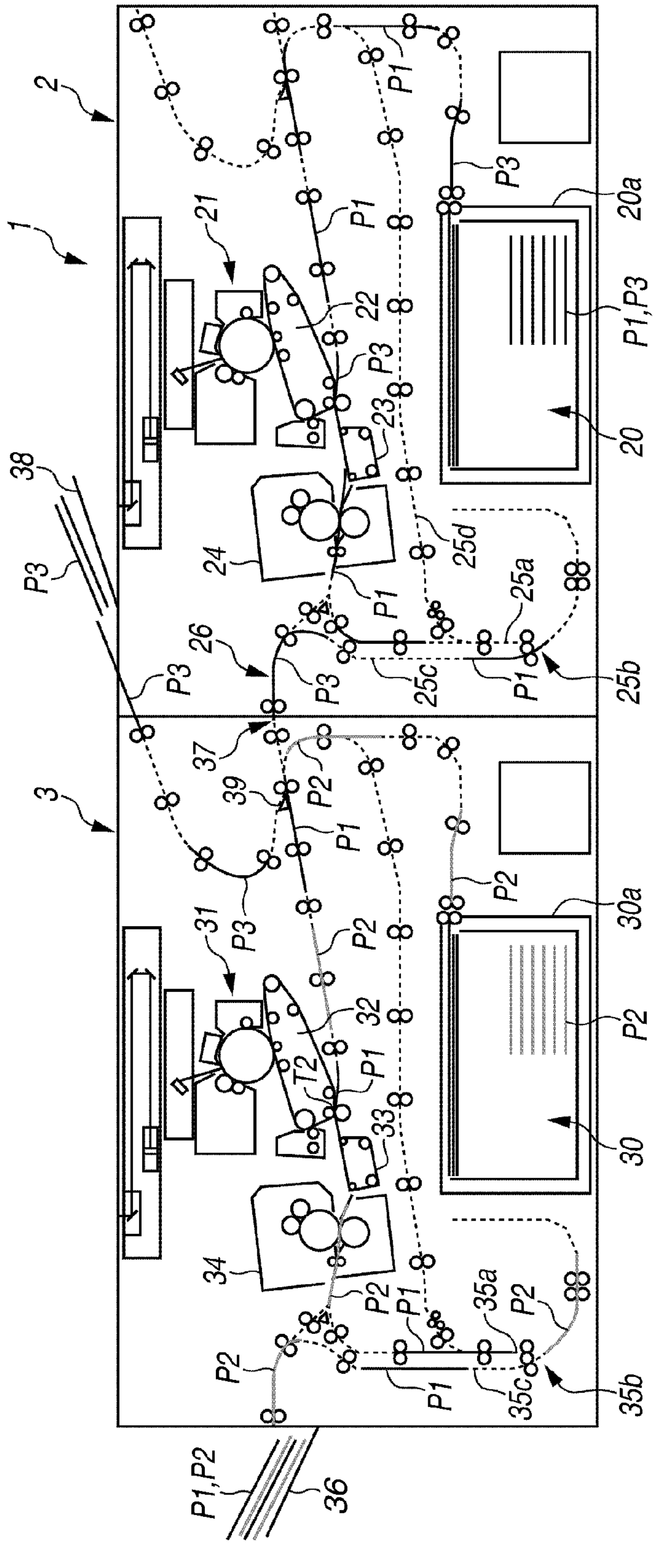
FIG. 13 illustrates a sheet flow in the fourth image formation processing according to the second exemplary embodiment.

An image forming apparatus 1A according to a second exemplary embodiment of the present invention will be described below with reference to FIGS. 11 to 13. FIG. 11 is a flow chart illustrating control processing performed by an image formation control unit 4A of the image forming apparatus 1A according to the second exemplary embodiment. FIG. 12 is a flow chart illustrating fourth image formation processing performed by the image formation control unit 4A according to the second exemplary embodiment. FIG. 13 illustrates a sheet flow in the fourth image formation processing according to the second exemplary embodiment.

The image forming apparatus 1A according to the second exemplary embodiment is different from the image forming apparatus 1 according to the first exemplary embodiment in combined processing (combined job) including two-sided image printing and one-sided image printing by the image formation control unit 4A. Therefore, the second exemplary embodiment will be described below focusing on the difference from the first exemplary embodiment, i.e., the fourth image formation processing as combined processing including two-sided image printing and one-sided image printing by the image formation control unit 4A.

Configurations in the second exemplary embodiment similar to those of the image forming apparatus 1 according to the first exemplary embodiment will be described with reference to the same figures. Further, identical elements are assigned the same reference numerals and therefore descriptions thereof will be omitted. This means that configurations in the second exemplary embodiment similar to those in the first exemplary embodiment have effects similar to those of the first exemplary embodiment.

As illustrated in FIG. 1, the image forming apparatus 1A according to the second exemplary embodiment includes the first image forming apparatus 2, the second image forming apparatus 3 coupled with the first image forming apparatus 2, and the image formation control unit 4A which controls the first image forming apparatus 2 and the second image forming apparatus 3. The image formation control unit 4A includes the CPU 40, the ROM 41 for storing a control program, and the RAM 42 used as an area for temporarily storing control data and as a work area for control-related calculations.

The fourth image formation processing which is combined processing including one-sided image formation processing and two-sided image formation processing will be described below. Referring to FIG. 11, in step ST40, when the user inputs an execution request (job) from the operation unit 5, the image formation control unit 4A first recognizes the execution request (job) input by the user.

In step ST41, after recognizing the execution request (job) from the user, the image formation control unit 4A determines whether the execution request (job) is a combined job including two-sided and one-sided image printing. When the execution request (job) is not the combined job including two-sided and one-sided image printing (NO in step ST41), the processing proceeds to step ST42.

In step ST42, the image formation control unit 4A determines whether the execution request (job) includes two-sided image printing. When the execution request (job) includes two-sided printing (YES in step ST42), the processing proceeds to step ST43. In step ST43, the image formation control unit 4A performs the first image formation processing which is two-sided image formation processing. On the other hand, when the execution request (job) does not include two-sided printing (NO in step ST42), the processing proceeds to step ST44. In step ST44, the image formation control unit 4A performs the second image formation processing which is one-sided image formation processing.

On the other hand, when the execution request (job) is combined processing (combined job) including two-sided and one-sided image printing (YES in step ST41), the processing proceeds to step ST45.

In step ST45, the image formation control unit 4A determines whether there is another execution request (job) different from the combined processing including the two-sided and one-sided image printing. When there is no execution request (job) different from the combined processing (NO in step ST45), the processing proceeds to step ST46. In step ST46, the image formation control unit 4A performs the third image formation processing.

On the other hand, when there is the execution request (job) different from the combined processing (YES in step ST45), the processing proceeds to step ST47. In step ST47, the image formation control unit 4A determines whether the execution request (job) different from the combined processing includes one-sided printing. When the execution request (job) does not include one-sided printing (NO in step ST47), the processing proceeds to step ST46. In step ST46, the image formation control unit 4A performs the third image formation processing. On the other hand, when the execution request (job) includes one-sided printing (YES in step ST47), the processing proceeds to step ST48. In step ST48, the image formation control unit 4A performs the fourth image formation processing.

After completion of the first, second, third, or fourth image formation processing, in step ST49, the image formation control unit 4A determines whether all of execution requests (jobs) from the user are completed. When all of the execution requests (jobs) are completed (YES in step ST49), the processing (control operation) ends. On the other hand, when all of the execution requests (jobs) are not completed (NO in step ST49), the processing returns to step ST41 and then repeats the above-described steps.

The fourth image formation processing which is combined processing including one-sided image formation processing and two-sided image formation processing will be described below, along with the flow of the sheet P1, with reference to FIGS. 12 and 13. Since operations of the first image formation driving unit 52, the first conveyance driving unit 53, the second image formation driving unit 54, and the second conveyance driving unit 55 are similar to those in the first image formation processing, descriptions thereof will be omitted.

Referring to FIGS. 12 and 13, in step S51, when the fourth image formation processing is started, the image formation control unit 4A determines whether the current page is subjected to one-sided image formation processing. When the current page is subjected to one-sided image formation processing (YES in step ST51), the processing proceeds to step ST52. In step ST52, the image formation control unit 4A sets the switching member 39 to the second position (refer to FIG. 2B).

After setting the switching member 39 to the second position, in step ST53, the image formation control unit 4A drives the first conveyance driving unit 53 and the second conveyance driving unit 55 to start feeding the sheets P1 and P2. In step ST54, the image formation control unit 4A drives the second image formation driving unit 54 to perform one-sided image formation processing related to the combined processing, and drives the first image formation driving unit 52 to perform one-sided image formation processing related to the execution request (job) different from the combined processing.

On the other hand, when the current page is not subjected to one-sided image formation processing, i.e., it is subjected to two-sided image formation processing (NO in step ST51), the processing proceeds to step ST55. In step ST55, the image formation control unit 4A sets the switching member 39 to the first position (refer to FIG. 2A).

After setting the switching member 39 to the first position, in step ST56, the image formation control unit 4A drives the first conveyance driving unit 53 to start feeding the sheet P1, and then drives the first image formation driving unit 52 to form an image on the first side (one side) of the sheet P1. After completion of image formation on the first side of the sheet P1, the image formation control unit 4A reversely rotates the reversing roller pair 25*b* to reverse the front and back sides of the sheet P1. Then, the sheet P1 is conveyed to the second image forming unit 31 via the second reversing path 25*c*, the sheet discharge unit 26, and the sheet receiving unit 37.

In step ST57, the image formation control unit 4A drives the second image formation driving unit 54 to form an image on the second side of the sheet P1. After the sheet P1 with the image formed on the second side is conveyed to the first reversing path 35*a*, the image formation control unit 4A reversely rotates the reversing roller pair 35*b* to reverse the front and back sides of the sheet P1 (the first side becomes the front side). Then, the sheet P1 is stacked on the sheet discharge unit 36 via the second reversing path 35*c*.

In step ST58, the image formation control unit 4A determines whether all of two-sided or one-sided printing related to the execution request (job) are completed (whether printing for the last page is completed). When the image formation control unit 4A determines that all of two-sided or one-sided printing are not completed (NO in step ST58), the processing returns to step ST51. On the other hand, when the image formation control unit 4A determines that all of two-sided or one-sided printing are completed (YES in step ST58), the fourth image formation processing ends, and then the processing returns to the main control operation of the image formation control unit 4A.

The thus-configured image forming apparatus 1A according to the second exemplary embodiment has the following effects.

When there is another execution request (job) different from the combined processing in the combined processing including two-sided and one-sided image printing, the image forming apparatus 1A according to the second exemplary embodiment performs the execution request (job) different from the combined processing at the time of one-sided image printing in the combined processing. Therefore, for example, when the second image forming unit 31 performs one-sided image printing in the combined processing, the execution request (job) different from the combined processing can be performed by the first image forming unit 21, so that the degradation of the productivity of the image forming apparatus 1A can be prevented. In other words, a waiting state (idling state) of the first image forming unit 21 can be avoided and the productivity thereof can be improved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-150243 filed Jun. 30, 2010, which is hereby incorporated by reference herein in its entirety.

What is claimed is:

1. An image forming apparatus comprising:

a first image forming unit;

a second image forming unit disposed downstream of the first image forming unit in a sheet conveyance direction;

an intermediate conveyance unit configured to convey a sheet on which an image is formed by the first image forming unit to the second image forming unit;

an intermediate discharge unit which is branched from the intermediate conveyance unit and configured to discharge the sheet on which an image is formed by the first image forming unit; and an image formation control unit configured to control image formation processing by the first image forming unit and the second image forming unit, wherein, if one-sided image formation in combined processing to perform two types of processing including one-sided image formation and two-sided image formation is performed, the image formation control unit forms an image on one side of the sheet by the second image forming unit, wherein, if the two-sided image formation in the combined processing is performed, the image formation control unit forms an image on a first side of the sheet by the first image forming unit, and then forms an image on a second side of the sheet by the second image forming unit, and wherein, if there is an execution request for a job of one-sided image formation processing different from a combined job of the combined processing during execution of the combined job, the image formation control unit, while performing the one-sided image formation in the combined job of the combined processing by the second image forming unit, performs the one-sided image formation related to the execution request for the job of the one-sided image formation processing different from the combined job by the first image forming unit and then discharges from the intermediate discharge unit a sheet which has undergone the one-sided image formation processing in the job different from the combined job.

2. The image forming apparatus according to claim 1, further comprising:

a first feed unit configured to feed a sheet to the first image forming unit;

a second feed unit configured to feed a sheet to the second image forming unit; and a switching member disposed at the intermediate conveyance unit and configured to selectively set to any one of a first, a second, or a third position, wherein the first position is used for conveying a sheet on which an image is formed by the first image forming unit and a sheet fed from the second feed unit to the second image forming unit, the second position is used for conveying the sheet on which the image is formed by the first image forming unit to the intermediate discharge unit and conveying the sheet fed from the second feed unit to the second image forming unit, and the third position is used for conveying the sheet on which the image is formed by the first image forming unit and the sheet fed from the second feed unit to the intermediate discharge unit.

* * * * *